United States Patent [19]
Langstroth

[11] Patent Number: 4,719,846
[45] Date of Patent: Jan. 19, 1988

[54] METHOD AND CIRCUMFERENTIAL SLIDER APPARATUS FOR BALANCING LATERAL FORCE BETWEEN PISTON AND CYLINDER WALL

[76] Inventor: Steven W. Langstroth, 500 S. Carmichael, No. 332D, Sierra Vista, Ariz. 85635

[21] Appl. No.: 411

[22] Filed: Jan. 5, 1987

[51] Int. Cl.$^4$ ............................ F01B 31/00; F16J 1/10
[52] U.S. Cl. .................................. 92/127; 92/181 R; 92/190
[58] Field of Search ................. 92/208, 201, 126, 127, 92/181 R, 190

[56] References Cited

U.S. PATENT DOCUMENTS

| 2,802,706 | 8/1957 | Adams | 309/4 |
|---|---|---|---|
| 3,035,879 | 5/1962 | Hanny et al. | 309/5 |
| 3,058,792 | 10/1962 | Elford et al. | 309/7 |
| 3,137,439 | 6/1964 | Hanny et al. | 230/188 |
| 3,906,923 | 9/1975 | Harker | 123/193 |
| 4,058,104 | 11/1977 | Swoager | 123/193 |
| 4,111,104 | 9/1978 | Davison, Jr. | 92/127 |
| 4,158,328 | 6/1979 | Beardmore | 92/212 |
| 4,508,019 | 4/1985 | Kabele et al. | 92/158 |

FOREIGN PATENT DOCUMENTS 2031091  6/1970  Fed. Rep. of Germany.
1221170 12/1959  France.
 194959  3/1923  United Kingdom.

Primary Examiner—Alan Cohan
Attorney, Agent, or Firm—Cahill, Sutton & Thomas

[57] ABSTRACT

A pair of circumferential sliders are positioned symmetrically on opposite sides of a piston, an inner surface of each circumferential slider being connected to a respective bevel rack gear. The rack gears are driven by bevel pinion gears that are attached to opposite ends of a wrist pin connecting the piston to a connecting rod. A pair of passages extend from the top of the piston to a pair of opposite, symmetrically positioned windows that are enlarged and reduced as a crankshaft connected to the lower portion of the connecting rod rotates in order to apply combustion or compression gas pressure in a cylinder to opposed varying areas of the cylinder wall so as to offset the varying lateral component of force applied by the connecting rod to the piston.

15 Claims, 19 Drawing Figures

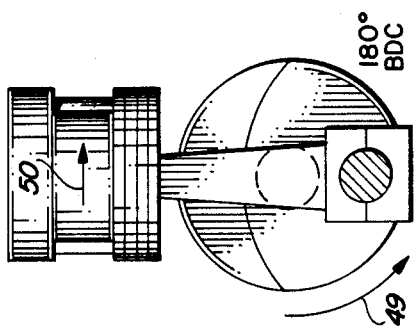 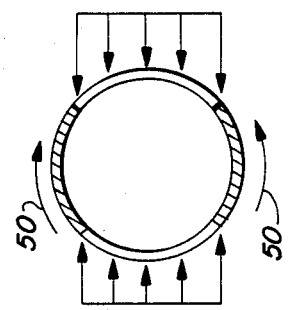
FIG. 6E  FIG. 7E
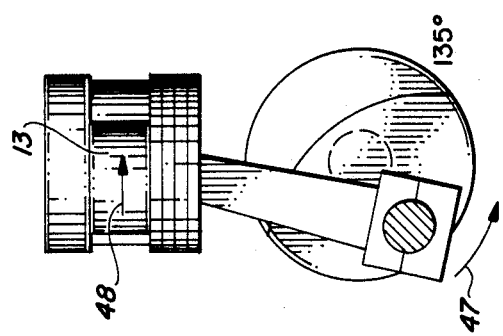 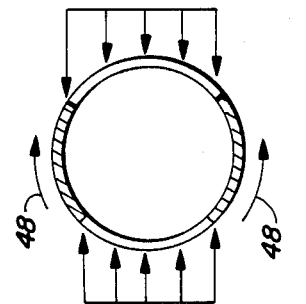
FIG. 6D  FIG. 7D
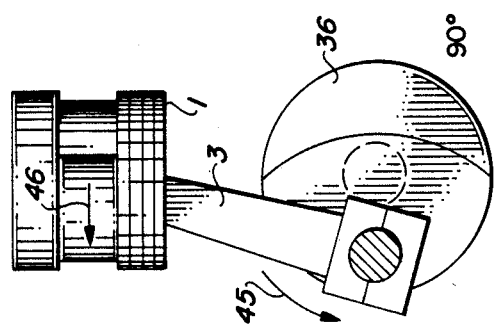 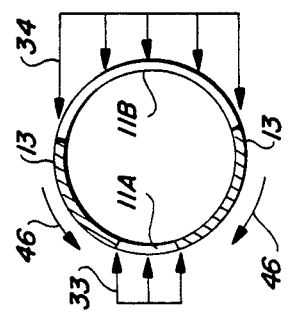
FIG. 6C  FIG. 7C
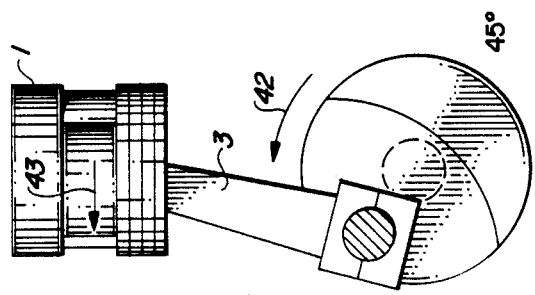 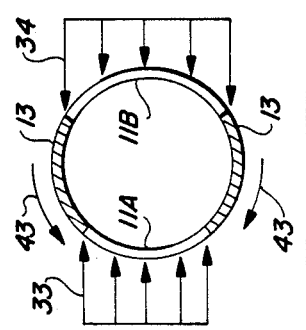
FIG. 6B  FIG. 7B
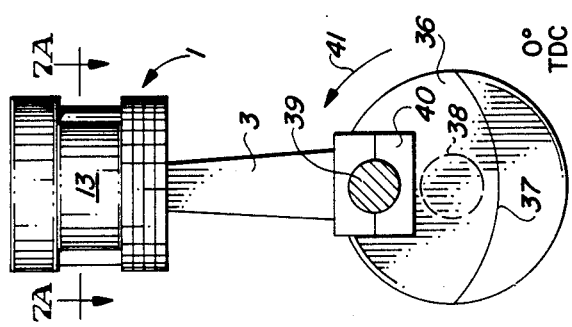 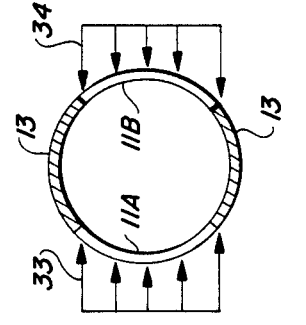
FIG. 6A  FIG. 7A

METHOD AND CIRCUMFERENTIAL SLIDER APPARATUS FOR BALANCING LATERAL FORCE BETWEEN PISTON AND CYLINDER WALL

BACKGROUND OF THE INVENTION

The invention relates to methods and apparatus for reducing frictional force between a piston and a cylinder in an engine, compressor, or the like, and relates more specifically to methods and apparatus for balancing lateral component of force imparted to a piston from its connecting rod to reduce such friction.

It is well-known that in reciprocating piston engines and compressors, the force imparted to the piston by the connecting rod has a horizontal component that force the walls of the piston against one side or the other of the cylinder wall, thereby increasing frictional forces. (Piston friction is thought to be a combination of dry (metal on metal) friction and fluid dynamic drag (assuming there are some traces of fluid between the piston and cylinder wall, such as oil). It is also thought that dry friction is the predominate component.) Such horizontal component of force is present for all orientations of the crankshaft except those in which the connecting rod is precisely vertical. Various efforts have been made to reduce such increased frictional forces. The state-of-the-art is generally shown by U.S. Pat. Nos. 2,802,706, 3,035,879, 3,058,792, 3,137,439, 3,906,923, 4,058,104, 4,111,104, 4,158,328, and 4,508,019 and U.K. Pat. No. 194,959, French Pat. No. 1,221,170, and German Pat. No. 2,031,091. Of the above references, U.S. Pat. Nos. 4,058,104 and 4,111,104 and British Pat. No. 194,959, French Pat. No. 1,221,170 and German Pat. No. 2,031,091 disclose the concept of using compression gas pressure from the cylinder to pass through a wall of the piston and produce a lateral counterforce against the cylinder wall, reducing friction caused by lateral forces on the piston. None of the prior art known to me discloses a practical apparatus for reducing frictional force between a piston and cylinder by accurately balancing the lateral force produced on the piston by the connecting rod thereof. If a practical, reliable structure could be provided that effectively offsets such lateral forces, reduced engine wear, and improved fuel economy could be achieved in internal combustion engines. Reduced wear could be achieved in compressors.

SUMMARY OF THE INVENTION

Accordingly, it is an object of the invention to provide a method and apparatus for reducing frictional force between a piston and a cylinder wall of an engine or compressor.

It is another object of the invention to provide a method and apparatus for reducing lateral force imparted to a cylinder wall by a piston therein and thereby reduce frictional force between the piston and the cylinder wall.

It is another object of the invention to provide a method and apparatus for precisely offsetting lateral force imparted to a piston by a crankshaft connected thereto throughout a piston cycle, by using high pressure combustion gas and varying projected areas of the piston wall adjacent to the cylinder wall and resisting high pressure combustion gas force against the wall to balance the varying lateral force applied by a connecting rod to a piston in an internal combustion engine as the piston undergoes a power stroke or a compression stroke.

Briefly described, and in accordance with one embodiment thereof, the invention provides a piston having a pair of blowby passages between the upper surface of the piston and a pair of side "windows" symmetrically positioned on opposite sides of the wrist pin connection, and provides a pair of circumferential sliders mechanically coupled to the wrist pin and moving together to reduce the projected area of one of the windows exposed to the cylinder wall while correspondingly enlarging the projected area of the opposite window during one 180 degree portion of the rotation of a crankshaft connected to the connecting rod, moving the circumferential sliders in the opposite direction to increase the first area and reduce the second area during the following 180 degrees of rotation of the crankshaft. In the described embodiment of the invention, the connecting rod is rigidly connected to the wrist pin, causing the wrist pin to rotate with the connecting rod. A pair of bevel pinion gears are attached to opposite ends of the wrist pin. The circumferential sliders move in precision way guides in the piston walls along side of the opposite ends of the wrist pin. Each of the inner surfaces of the circumferential sliders is attached to a respective bevel rack gear that engages the teeth of the bevel pinion gears, causing symmetrical circumferential sliding of the circumferential sliders as the wrist pin and bevel pinion gears rotate. The vertical ends of the cirumferential sliders decrease the area of the cylinder wall and adjacent piston side wall exposed to high pressure gas and correspondingly increase the area of the opposite side of the cylinder wall and adjacent piston side wall exposed to the high pressure gas as the piston goes through a cycle. Gas seals are provided on the outer and inner surfaces of the circumferential sliders to prevent gas leakage from one side of the piston to the other. Compression rings and an oil ring are provided in the skirt of the piston beneath the first and second openings exposing the first and second areas of the cylinder wall. The resulting net varying lateral force applied to the piston by the combustion or compression gas in the two varying side window areas of the piston offsets the varying lateral force applied by the connecting rod to the piston as the crankshaft rotates.

The invention will be better understood with reference to the following drawing, description and appended claims.

BRIEF DESCRIPTION OF THE DRAWINGS

FIGS. 6A–6E are partial side view diagrams useful in explaining the operation of the circumferential sliders 13 of piston 1 during 180 degrees of the crankshaft.

FIGS. 7A–7E correspond to FIGS. 6A–6E, respectively, and illustrate the corresponding positions of the circumferential sliders 13 and the resultant balancing counterforces produced by combustion gas on the side window areas of the piston exposed between the circumferential sliders 13.

DETAILED DESCRIPTION OF THE INVENTION

Figure 1:
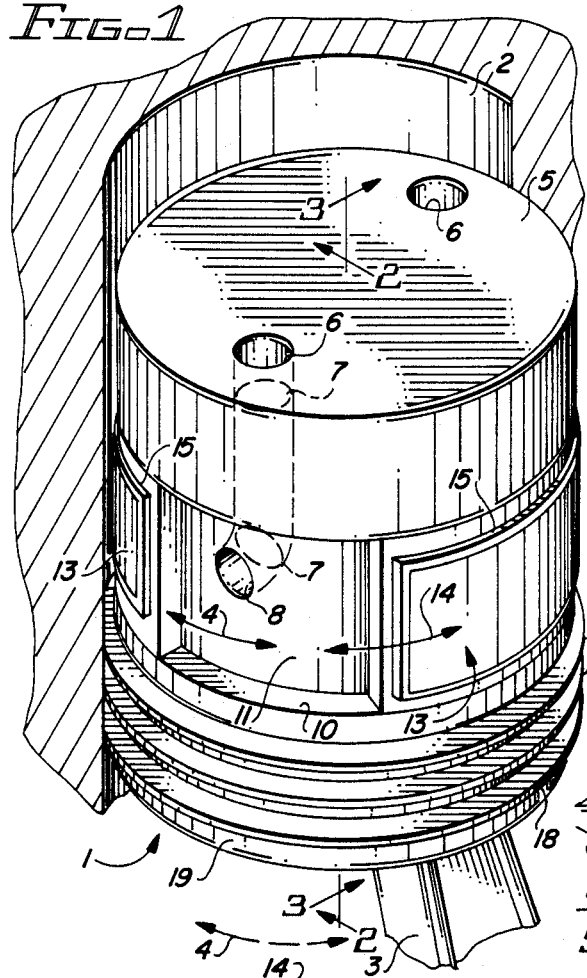
FIG. 1 is a partial perspective view illustrating the piston, a portion of the cylinder wall, and the circumferential slider apparatus of the present invention.

Referring now to the drawings, especially FIGS. 1–5, piston 1 is disposed within a cylinder 2 in a compressor or internal combustion engine. Connecting rod 3 is rigidly connected to a wrist pin 21 (FIG. 2), which rotates in the direction of arrows 4 as piston 1 undergoes its normal cycles as a crankshaft 36 (FIG. 6A) continues to rotate in a normal manner.

The top surface 5 of piston 1 has a pair of compression gas passages 7 therein which allow compression gases above piston 1 to pass through the upper portion 9 (FIG. 2) of piston 1, and through side wall portions 12 to terminate at openings 8 (FIG. 1) exposing recessed surfaces 11 which are bounded by windows 10 on symmetrically opposed sides of piston 2.

Piston 1 also includes a pair of compression rings 17 and an oil scraping ring 18 circumferentially disposed in grooves around the skirt portion 19 thereof.

Figure 5:
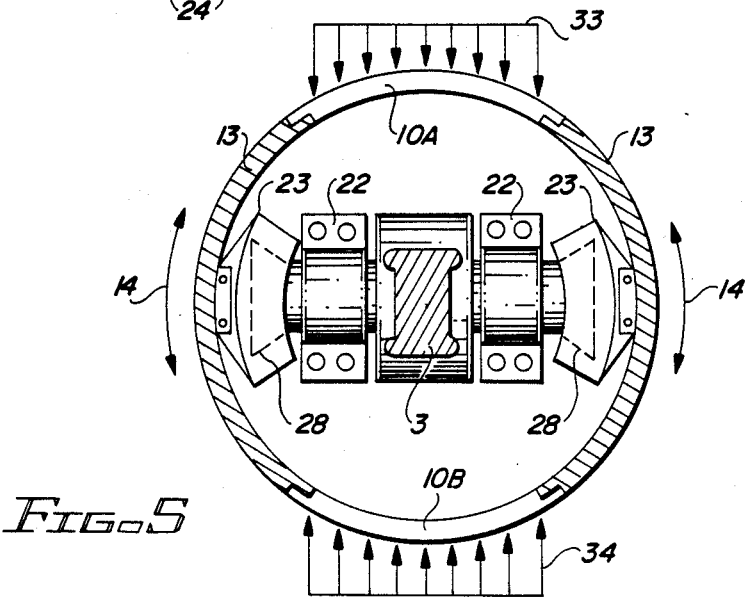
FIG. 5 is a section view taken along section line 5—5 of FIG. 3.

In accordance with the present invention, a pair of circumferential sliders, each semicylindrical, are disposed to move laterally about the cylindrical recessed side wall surfaces of piston 2 in the directions of arrows 14, thereby providing first and second side wall gaps 10A and 10B, (FIG. 5) exposing corresponding side wall areas of the cylinder wall 2 and the piston sides to compression gases produced above the piston top surface 5 and routed through compression gas passages 7 to the side wall gaps 10A and 10B. In Fig. 5, arrows 33 represent lateral compression gas forces produced on the piston 1 by virtue of the exposed first and second projected areas of the cylinder wall and piston side area exposed by gaps 10A and 10B.

The compression gases routed through the compression gas passages 7 are confined to the areas of the cylinder wall exposed and bounded by the upper portion of the piston, and the compression rings 17 and by gas seals 15 disposed on the outer surface of the circumferential sliders and also by inner gas seals 27 disposed on the inner surface of the circumferential sliders 13.

Figure 4:
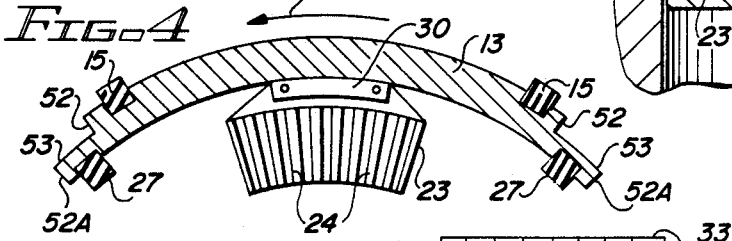
FIG. 4 is a section view taken along section line 4—4 of FIG. 3.
Figure 5A:
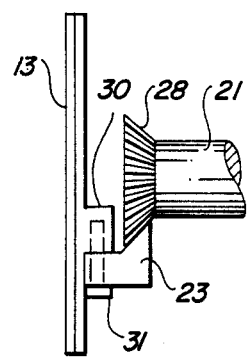
FIG. 5A is a partial section view better illustrating the detail of connecting the bevel rack gear to the circumferential slider in the structure of FIG. 3.

In accordance with the present invention, a bevel rack gear 23 having teeth 24 is rigidly attached to a central portion of the inner surface of each circumferential slider 13. The bevel rack gear 23 is attached to circumferential slider 23 by means of a tab 30 and bolts 31, as shown in Figs. 3, 4 and 5A, to facilitate installation of the circumferential sliders.

Figure 2:
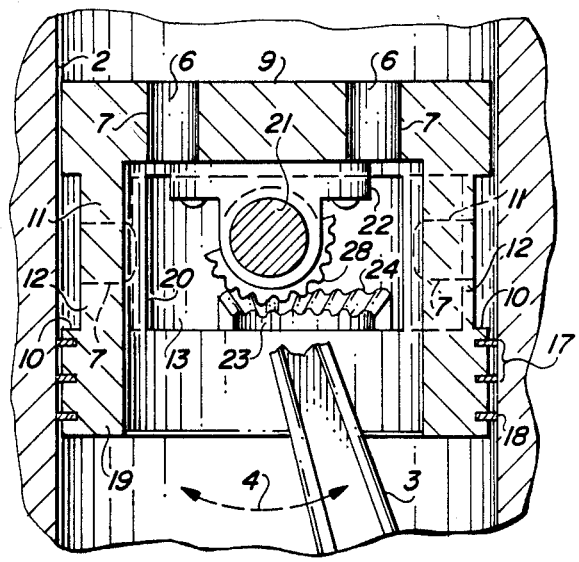
FIG. 2 is a section view taken along section line 2—2 of FIG. 1.
Figure 3:
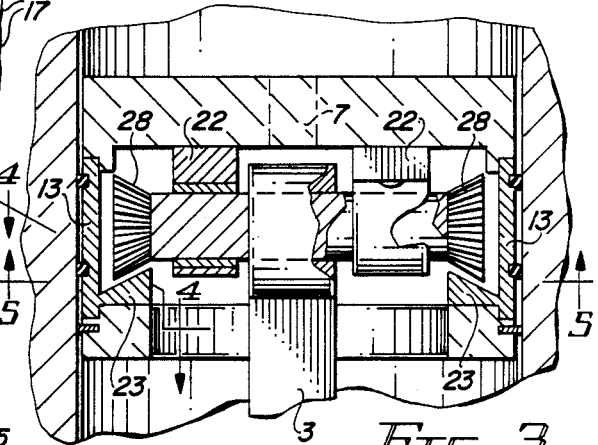
FIG. 3 is a section view along section line 3—3 of FIG. 1.

Wrist pin 21 is journaled in bearing assemblies 22, which are attached to the bottom surface of upper section 9 of piston 1 in a conventional fashion, as shown in FIGS. 2, 3, and 5. A pair of bevel pinion gears 28 having teeth that respectively mesh with the teeth 24 of bevel rack gears 23 are provided, as shown in FIGS. 2, 3, and 5. Thus, when connecting rod 3 swings in the directions of arrows 4, bevel pinion gear 28 rotates, causing bevel rack gear 23 to rotate, moving circumferential sliders 13 in the directions of arrows 14, decreasing one of the exposed surface side wall areas 11 and correspondingly increasing the opposite one, and altering the net lateral force produced on piston 1 by the gases as a function of the connecting rod position.

The operation of the circumferential sliders and piston 1 can be best seen with reference to FIGS. 6A–6E and corresponding top view FIGS. 7A–7E. In FIGS. 6A–6E, reference numeral 36 represents a portion of a conventional crankshaft. Reference numeral 37 represents a counterbalance portion of the crankshaft. Reference numeral 38 designates the crankshaft main bearing section, reference numeral 39 designates the connecting rod bearing section of the crankshaft, and reference numeral 40 designates the lower connecting rod bearing assembly.

Referring first to FIGS. 6A and 7A, assume that the crankshaft angular position is at top dead center (TDC), a "neutral" angular position defined to be 0 degrees. There is no lateral force imparted by connected rod 3 onto piston 1.

As crankshaft 36 rotates counterclockwise in the direction of arrow 42, circumferential sliders 13 move to the left, as indicated by arrows 43 in FIGS. 6B and 7B, reducing gaps or side wall area 11A and increasing gap or side wall area 11B. The net lateral combustion gas force 34 to the left begins to exceed the net lateral compression gas force 33 oriented to the right, producing a horizontal difference force to the left on piston 1, thereby precisely offsetting the horizontal component of the force exerted by connecting rod 3 on piston 1 and thereby greatly reducing the frictional force between piston 1 and cylinder 2 (FIG. 1). As crankshaft 36 continues to rotate from the 45 degree position shown in FIGS. 6B to the 90 degree position shown in FIG. 6C, circumferential sliders 13 rotate further to the left, as indicated by arrows 36 in FIGS. 6C and 7C, minimizing the gap area 11A, maximizing the gap area 11B, and increasing the net compressive gas force on piston 1 to the left to a maximum value, thereby offsetting the maximum horizontal force to the right exerted by connecting rod 3 on piston 1.

The projected areas, and thus the resulting force, is colinear with the horizontal force on the wrist pin. Therefore, no net movement about the wrist pin is produced other than the minor friction force of the sliders times one-half the wrist pin bevel gear diameter.

As crankshaft 36 continues to rotate from the 90 degree position to the 135 degree position, as indicated by arrow 47 in FIG. 6D, circumferential sliders 13 begin to move to the right, as indicated by arrows 48 in FIGS. 6D and 7D, equalizing the exposed side wall areas 11A and 11B, and equalizing the net compression gas lateral forces on piston 1 by the time crankshaft 36 reaches the 180 degree position shown in FIGS. 6E and 7E. The operation is essentially the same for rotation of the crankshaft from the 180 degree bottom dead center (BDC) position shown in FIG. 6E back up to the 0 degree or TDC position shown in FIG. 6A, except that the circumferential sliders move in the opposite directions.

As shown in FIGS. 4 and 5, the vertical end portions of each of the circumferential sliders 13 are provided with a right angle recess formed by a vertical wall 52 that is perpendicular to the outer major surface of the circumferential slider and a vertical area 53 that is parallel thereto. The areas 53 are chosen so that the inward component of compressive gas force on area 53 precisely offsets the outer components of force due to compressive gas pressure on surface 52 and 52A.

Figure 8A:
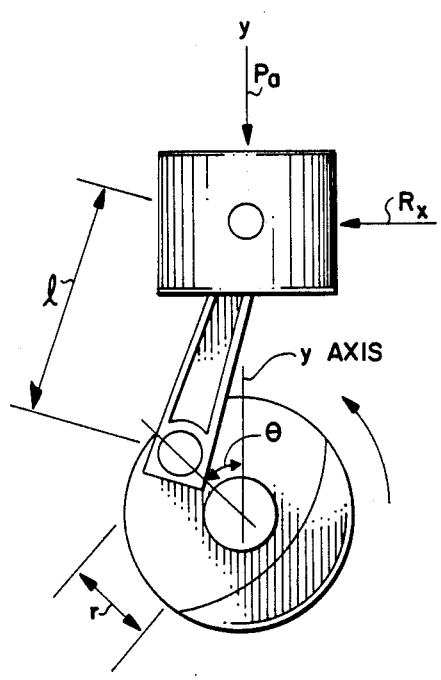
FIGS. 8A–8C are diagrams useful in explaining derivation of design equations for the invention.
Figure 8B:
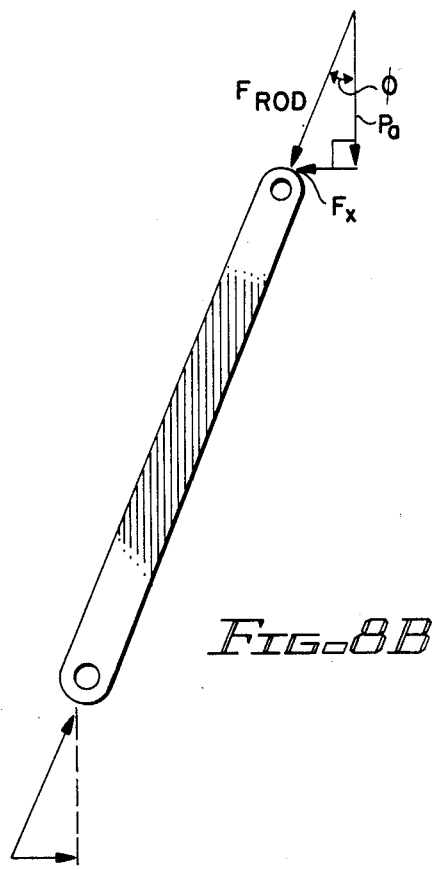
Figure 8C:
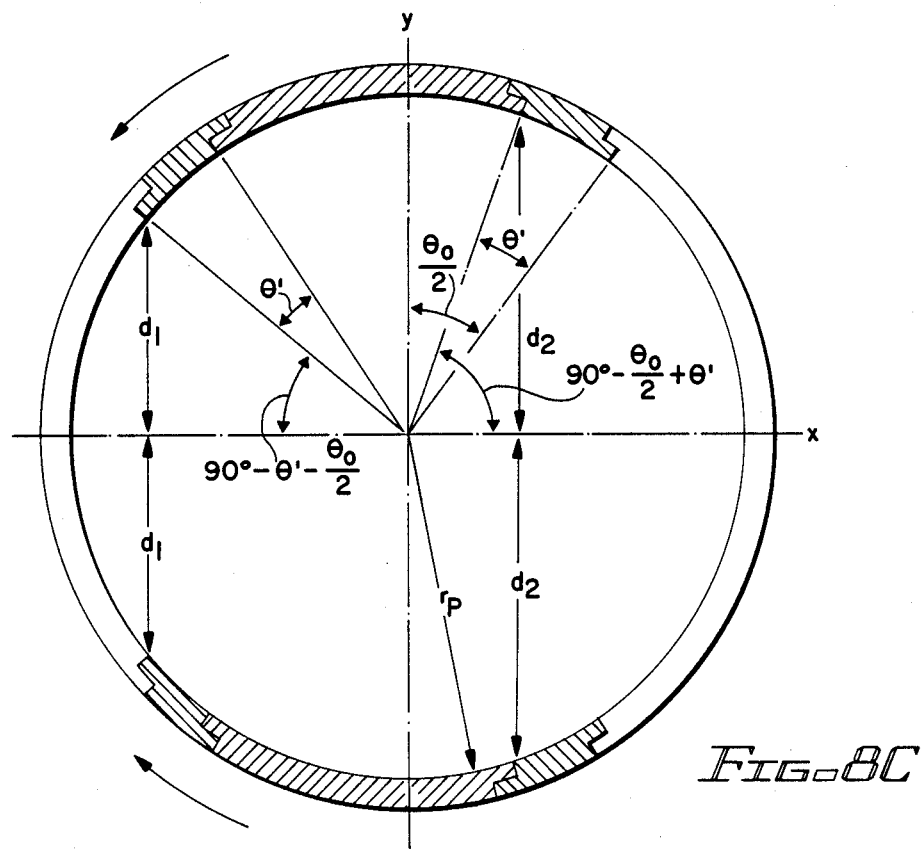

An analytical approach to designing the above-described structure will be outlined next. In FIGS. 8A–8C, the following definitions are indicated:

$\phi$ = angle of longitudinal axis of connecting rod;

$\theta$ is the angle between the vertical axis or y axis of the piston and the line between the center of the crankshaft main bearing and the connecting rod bearing;

r = distance between center of crankshaft main bearing and connecting rod bearing;

l = length of connecting rod;

a is area of top of piston;

p is the compressive gas pressure above the piston;

(p)(a) is the downward force on the piston;

$R_x$ = force required to balance lateral component of connecting rod force, $F_x$;

$F_x$ = lateral component of connecting rod force on piston;

$(2)(d_1)$ = projected distance between sliders on their "closed" side (FIG. 8C);

$(2)(d_2)$ = projected distance between sliders on their "open" side (FIG. 8C);

h = height of circumferential sliders;

r' = wrist pin bevel gear radius;

$r_p$ = radius of curvature of circumferential sliders;

$\theta'$ = rotational angle through which slide moves;

$\theta_0$ = angle that encompasses slider;

$r_p'$ = radius of curvature of circular rack gear segment attached to slider.

The lateral force $F_x$ and its derivation are indicated by equations (1)–(3) below.

$$\frac{l}{\sin\theta} = \frac{r}{\sin\phi}, \qquad (1)$$

according to the law of sines.

From FIG. 8B, it is apparent that (2) $F_x = (P)(a)\tan\phi$ (Note that there is little or no piston friction with the described mechanism; if there were a significant amount of piston friction $F_x$ would be equal to (P.a -piston friction)$\tan\phi$.)

Thus, $$F_x = (P)(a)\tan\left[\sin^{-1}\left(\frac{r}{l}\sin\theta\right)\right] \qquad (3)$$

The equation for the force $R_x$ and its derivation are indicated below:

$$R_x = P(A_{proj2} - A_{proj1}), \text{ where} \qquad (4)$$

$A_{proj1} = (2)(h)(d_1) = a1$, and $A_{proj2} = (2)(h)(d_2)$.

From FIG. 8C, it can be seen that:

$d_1 = r_p \sin(90° - \theta' - \theta_0/2)$, and $d_2 = r_p \sin(90° + \theta' - \theta_0/2)$.

$$R_x = \qquad (5)$$

$$2Phr_p\left[\sin\left(90° + \theta' - \frac{\theta_0}{2}\right) - \sin\left(90° - \theta' - \frac{\theta_0}{2}\right)\right].$$

The equation for design of the above-described circumferential slider system is obtained by equating the net combustion gas lateral force $R_x$ to the horizontal component of the connecting rod force applied to the piston, namely $F_x$:

(6) $R_x = F_x$

Thus, $$a\tan\sin^{-1}[(r/l)\sin\theta] = \qquad (7)$$

$$2hr_p[\sin(90° + \theta' - \theta_0/2) - \sin(90° - \theta' - \theta_0/2.]$$

Note that P is cancelled out of equation (7), so the balancing effect of the invention is independent of combustion gas pressure.

Equations (8)–(10) indicate the design of the gear ratio between the wrist pin gear and the slider circular rack so that the mechanical and compressive gas forces are precisely balanced:

$$(r') \times (\phi) = (r_p')(\theta') \qquad (8)$$

$$\frac{r'}{r_p'} = \frac{\theta'}{\phi} \qquad (9)$$

$$\frac{r'}{r_p'} = \frac{\theta'}{\sin^{-1}\left[\frac{r}{l}\sin\theta\right]} \qquad (10)$$

The foregoing equations can be solved for the desired variables by using a computer or by using graphical or other approximate solution techniques. One skilled in the art can solve the equations for various applications with undue effort.

The above-described apparatus is believed to cause the piston to ride on a cushion of high pressure combustion gas and prevent it from bearing directly on the cylinder wall throughout each power stroke and compression stroke of the crankshaft, reducing engine friction, engine wear, increasing fuel efficiency.

While the invention has been described with reference to a particular embodiment thereof, those skilled in the art will be able to make various modifications to the described embodiments of the invention without departing from the true spirit and scope thereof. It is intended that all techniques which are equivalent to those described herein in that they perform substantially the same function in substantially the same way to achieve the same result are within the scope of the invention.

I claim:

1. An apparatus for reducing friction between a piston and a cylinder, comprising means for balancing varying horizontal components of force applied by a connecting rod to the piston, the balancing means including in combination:

(a) first and second openings in the piston providing communication of compressive gas above the piston in the cylinder to first and second opposed side wall areas of the piston;

(b) movable first and second circumferential means, each symmetrically disposed on a side wall of the piston relative to ends of a wrist pin connecting the connecting rod to the piston and mechanically coupled to the connecting rod, for varying the first and second side wall areas in relation to the orientation of the connecting rod relative to the piston; and (c) means for mechanically coupling the connecting rod to the first and second circumferential means to
   i. move the first and second circumferential means toward the first side wall area thereby reduce the first side wall area approximately proportionally to a horizontal force component applied toward the first side wall areas onto the piston by the connecting rod and thereby increase the second side wall area approximately proportionately to that horizontal force component,
   ii. move the first and second circumferential means toward the second side wall area and thereby also reduce the amount of the second side wall area approxmately proportionally to a horizontal force component applied toward the second side wall area onto the piston by the connecting rod and thereby also increase the amount of the first area approximately proportionally to that horizontal force component,
during rotation of a crankshaft connected to a lower end of the connecting rod.

2. The apparatus of claim 1 wherein the first and second circumferential means include first and second semicylindrical plates slidably disposed along opposed first and second side wall portions of the piston and symmetrically disposed within recesses in the first and second side wall portions of the piston bounding and guiding the semicylindrical plates, wherein vertical edges of the first and second semicylindrical plates bound both the first and second side wall areas.

3. The apparatus of claim 2 wherein the mechanical coupling means include first and second rack and pinion mechanisms coupling the wrist pin to the first and second semicylindrical plates, respectively.

4. The apparatus of claim 3 wherein the first rack and pinion mechanism includes a first bevel rack gear attached to an inner surface of the first semicylindrical plate and a first bevel pinion gear attached to a first end of the wrist pin and meshing with the first bevel rack gear, and the second rack and pinion mechanism includes a second bevel rack gear attached to an inner surface of the second semicylindrical plate and a second bevel pinion gear attached to a second end of the wrist pin and meshing with the second bevel rack gear.

5. The apparatus of claim 4 including means for attaching the first bevel rack gear to the inner surface of the first semicylindrical plate and means for attaching the second bevel rack gear to the inner surface of second semicylindrical plate.

6. The apparatus of claim 4 including gas-tight sealing means disposed on the inner and outer surfaces of each of the first and second semicylindrical plates for sealing the compression gas bounded by the first and second side wall areas to prevent such compression gases from passing between the first and second semicylindrical plates and the walls of the cylinder.

7. The apparatus of claim 4 wherein the first and second semicylindrical plates each have parallel upper and lower edges slidably movable against bounding edges of the recesses in the first and second wall portions of the piston.

8. The apparatus of claim 7 wherein the radii of curvature of the pinion gear and rack gear, the height of the semicylindrical plates, and the surface length of the semicylindrical plates are selected to cause the net compressive forces applied to the piston at the first and second side wall areas to precisely offset the varying horizontal component of force applied by the connecting rod to the piston during rotation of the crankshaft.

9. The apparatus of claim 8 wherein the first and second semicylindrical plates each include notched edge portions, with notch areas selected to produce inward compressive gas force components on the notch areas which precisely offset outward compressive gas force components produced on end edges of the first and second semicylindrical plates.

10. A method for reducing friction between a piston and a cylinder by balancing varying horizontal component of force applied by a connecting rod to the piston, the method comprising the steps of:
(a) providing first and second openings in the piston and communicating pressure of compressive gas above the piston in the cylinder to first and second opposed side wall areas of the piston;
(b) providing movable first and second circumferential means, each symmetrically disposed on a side wall of the piston relative to ends of a wrist pin connecting the connecting rod to the piston;
(c) mechanically coupling the connecting rod to the first and second circumferential means to vary the first and second side wall areas in relation to the orientation of the connecting rod relative to the piston; and
(d) varying the orientation of the connecting rod relative to the piston to
   i. move the first and second circumferential means toward the first side wall area and thereby reduce the first side wall area approximately proportionally to a horizontal force component applied toward the first side wall areas onto the piston by the connecting rod and thereby increase the second side wall area approximately proportionately to that horizontal force component,
   ii. move the first and second circumferential means toward the second side wall area and thereby also reduce the amount of the second side wall area approxmately proportionally to a horizontal force component applied toward the second side wall area onto the piston by the connecting rod and thereby also increase the amount of the first area approximately proportionally to that horizontal force component,
by rotating a crankshaft connected to a lower end of the connecting rod.

11. The method of claim 10 wherein the first and second circumferential means include first and second semicylindrical plates slidably disposed along opposed first and second side wall portions of the piston and symmetrically disposed within recesses in the first and second side wall portions of the piston bounding and guiding the semicylindrical plates, wherein vertical edges of the first and second semicylindrical plates bound both the first and second side wall areas, the method including coupling the ends of the wrist pin to the first and second circumferential means by first and second rack and pinion mechanisms coupling the wrist pin to the first and second semicylindrical plates, respectively.

12. The method of claim 11 wherein the first rack and pinion mechanism includes a first bevel rack gear attached to an inner surface of the first semicylindrical plate and a first bevel pinion gear attached to a first end of the wrist pin and meshing with the first bevel rack gear, and the second rack and pinion mechanism includes a second bevel rack gear attached to an inner surface of the second semicylindrical plate and a second bevel pinion gear attached to a second end of the wrist pin and meshing with the second bevel rack gear, the method including attaching the first bevel rack gear to the inner surface of the first semicylindrical plate by means of a first pair of connecting pins and attaching the second bevel rack gear to the inner surface of second semicylindrical plate by means of a second pair of conneting pins.

13. The method of claim 11 including the inner and outer surfaces of each of the first and second semicylindrical plates to the cylinder wall to prevent such compression gases from passing from the first and second side wall areas between the first and second cylindrical plates and the walls of the cylinder.

14. The method of claim 13 including preventing the radii of curvature of the pinion gear and rack gear, the height of the semicylindrical plates, and the surface length of the semicylindrical plates such that the net compressive forces applied to the piston at the first and second side wall areas to precisely offset the varying horizontal component of force applied by the connecting rod to the piston during rotation of the crankshaft.

15. The apparatus of claim 13 including providing notched edge portions in the first and second semicylindrical plates with notch areas selected to produce inward compressive gas force component on the notch areas which precisely offset outward compressive gas force component produced on end edges of the first and second semicylindrical plates.

* * * * *